(12) United States Patent
Simensen

(10) Patent No.: US 12,222,244 B2
(45) Date of Patent: Feb. 11, 2025

(54) CAVITY FOR GAS MEASUREMENTS

(71) Applicant: Tunable AS, Oslo (NO)

(72) Inventor: Truls Simensen, Hagan (NO)

(73) Assignee: Tunable AS, Oslo (NO)

( * ) Notice: Subject to any disclaimer, the term of this patent is extended or adjusted under 35 U.S.C. 154(b) by 165 days.

(21) Appl. No.: 17/782,118

(22) PCT Filed: Dec. 15, 2020

(86) PCT No.: PCT/EP2020/086208
§ 371 (c)(1),
(2) Date: Jun. 2, 2022

(87) PCT Pub. No.: WO2021/122589
PCT Pub. Date: Jun. 24, 2021

(65) Prior Publication Data
US 2023/0010477 A1 Jan. 12, 2023

(30) Foreign Application Priority Data
Dec. 20, 2019 (NO) .............................. NO20191517

(51) Int. Cl.
*G01J 3/26* (2006.01)
*G01N 21/03* (2006.01)
*G01N 21/05* (2006.01)

(52) U.S. Cl.
CPC .............. *G01J 3/26* (2013.01); *G01N 21/031* (2013.01); *G01N 21/05* (2013.01); *G01N 2021/0382* (2013.01)

(58) Field of Classification Search
CPC ......... G01J 3/26; G01N 21/031; G01N 21/05; G01N 2021/0382; G01N 2021/8557; G01N 21/27
See application file for complete search history.

(56) References Cited

U.S. PATENT DOCUMENTS 1,522,849 A * 1/1925 Watson ..................... D21J 3/00
162/122
2,985,601 A * 5/1961 Kraft ..................... C08G 63/46
554/24
(Continued)

FOREIGN PATENT DOCUMENTS

EP 1522849 A1 4/2005
EP 1967842 A2 9/2008
(Continued)

OTHER PUBLICATIONS

Pisani, Francesca; International Search Report; PCT/EP2020/086208; dated Apr. 7, 2021; 4 pages.

*Primary Examiner* — Tarifur R Chowdhury
*Assistant Examiner* — Kemaya Nguyen
(74) *Attorney, Agent, or Firm* — Bradley Arant Boult Cummings

(57) ABSTRACT

This invention relates to retrievable measuring cell for optical measurements in gas, the cell being defined by a gas conducting pipe having an input end adapted to be connected to a gas flow input intruding gas into the cell and an output end adapted to be connected to a gas flow output. The pipe ends also being adapted to be coupled to optical components including an optical transmitter transmitting light into said cell and an optical receiver adapted to receive light having passed through said cell, the optical beam in said cell having a predetermined shape, the optical components including a light source, at least two minors and a light receiver being mounted in known positions on an external frame covered by the pipe ends. The cell has an elongated shape corresponding to the optical beam shape.

5 Claims, 4 Drawing Sheets

(56) References Cited

U.S. PATENT DOCUMENTS

| | | | |
|---|---|---|---|
| 5,065,025 A * | 11/1991 | Doyle | G01N 21/05 |
| | | | 250/573 |
| 5,574,232 A | 11/1996 | Davidson et al. | |
| 5,726,752 A | 3/1998 | Uno et al. | |
| 9,880,090 B2 * | 1/2018 | Charlton | G01N 21/05 |
| 2003/0090666 A1 * | 5/2003 | Kaufmann | G01N 21/3504 |
| | | | 356/438 |
| 2005/0163662 A1 * | 7/2005 | Mueller | G01N 21/05 |
| | | | 422/68.1 |
| 2006/0119851 A1 | 6/2006 | Bounaix | |
| 2007/0267575 A1 | 11/2007 | Holly et al. | |
| 2010/0110437 A1 | 5/2010 | Furtaw et al. | |
| 2010/0110438 A1 * | 5/2010 | Furtaw | G01N 21/3504 |
| | | | 356/437 |
| 2017/0168275 A1 | 6/2017 | Akamatsu | |
| 2018/0259452 A1 | 9/2018 | Li et al. | |

FOREIGN PATENT DOCUMENTS

| | | |
|---|---|---|
| EP | 2985601 A1 | 2/2016 |
| JP | H1038794 A | 2/1998 |
| JP | 2000074830 A | 3/2000 |
| JP | 2002202246 A | 7/2002 |
| JP | 2002202249 A | 7/2002 |
| WO | WO-2015069934 A2 | 5/2015 |

* cited by examiner

CAVITY FOR GAS MEASUREMENTS

The present invention relates to a retrievable measuring cell for optical measurements of gas, and a measuring instrument using the cell.

More in detail the present invention relates to a multiple reflection sample cell used in gas analyzers such as an infrared gas analyzer, and more specifically to of a multiple reflection type sample cell in which a long optical path is obtained with a limited volume. Such systems are well known, as shown in U.S. Pat. No. 5,726,752 and US2017168275A1 and as confirmed in U.S. Pat. No. 5,726,752 the sample cell should not be larger than the envelope representing the light beams propagating through the cell so that the exchange of gas in the cavity is fast. However, as expressed in U.S. Pat. No. 5,726,752 the solutions use specific samples of gas which slows down the measuring process. WO2015/069934 shows an example of a solution where the light has multiple passes through a gas cavity where the volume outside the light path is reduced to a minimum.

In addition, process gases, such as exhaust from engines, may contain contaminants that makes the optics dirty. An example of this may be exhaust from a combustion process. The particles and contaminations from the exhaust will deposit inside the measurement cell and on the optics. After some time of use, the transmission though the cell will be reduced, and it will be necessary to clean the optics and the cell. This kind of maintenance are often difficult and time consuming. Thus, it is also an object of the present invention to provide a solution allowing changing of the gas cell unit in a fast and reliable way.

Disassembling an optical instrument takes time, and optical alignment is more or less impossible outside the laboratory. This problem is solved by mounting and aligning all optical component on a frame and insert a gas guiding device into the frame. The gas guiding device is easily removed giving access to all optical components that needs cleaning. The gas guiding device can easily be exchanged with a new one, or the gas guiding device can be cleaned and refitted. Such a exchangeable cell is discussed in US2010/0110437.

One of the main problems with prior art gas cells, is that it takes a long time exchange the gas inside the measurement cell if continuous flow is applied. If the gas entrance and the gas exit is placed close to each other, the new gas flowing into the cell will typically mix with the old gas, and the exchange of gas will follow that of a typical dilution, i.e. 50% for the first gas cell volume injected, 75% for the second, and so on. If the gas cell is very long compared to the diameter, a laminar flow can be obtained, and most of the gas can be exchanged with only filling one gas volume. In the more typical gas cell, a laminar flow occurs between the gas entrance and the gas exit, but this will leave parts of the gas inside the cell unchanged. It will then typically take a long time to exchange all the gas inside the cell. One object of the present invention is to provide a solution where the measurements can be performed in a continuous manner to achieve short response time when changes in the gas composition occurs.

The objects presented above are obtained using an exchangeable gas cell and a measuring instrument including said cell, characterized as stated in the independent claims.

Thus, to be able to change the gas volume as fast as possible with a given flow, the walls of the gas cell according to the present invention is formed to follow the ray trace having combined inlets for optical measuring beams and gas flow. In this way, the volume inside the gas cell is minimized. Further, the gas cell is made thin and long, and the optical path is preferably made to cross itself to minimize the volume used. To avoid a laminar flow in part of the cell and other parts of the cell without any flow, a forced turbulence or swirl in the flow movement is generated. The entrance flow is preferably forced to start a rotational flow, where the flow pattern forms a spiral though the gas cell. This spiral flow forces all the old gas to flow in front of the new gas, and leaves no pockets of old gas behind. At the exit, a similar structure is preferably generated to force the exiting gas into a forced turbulence.

The invention will be described below with reference to the accompanying drawings, illustrating the invention by way of examples.

Figure 4A:
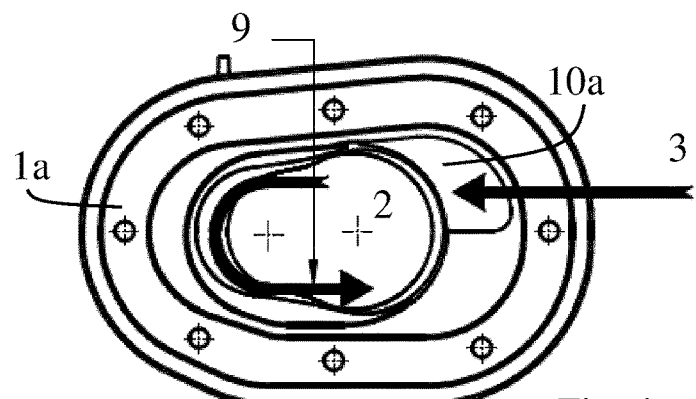

FIG. 4a,b illustrates the shape of the gas cell ends according to the preferred embodiment of the invention.

Figure 5:
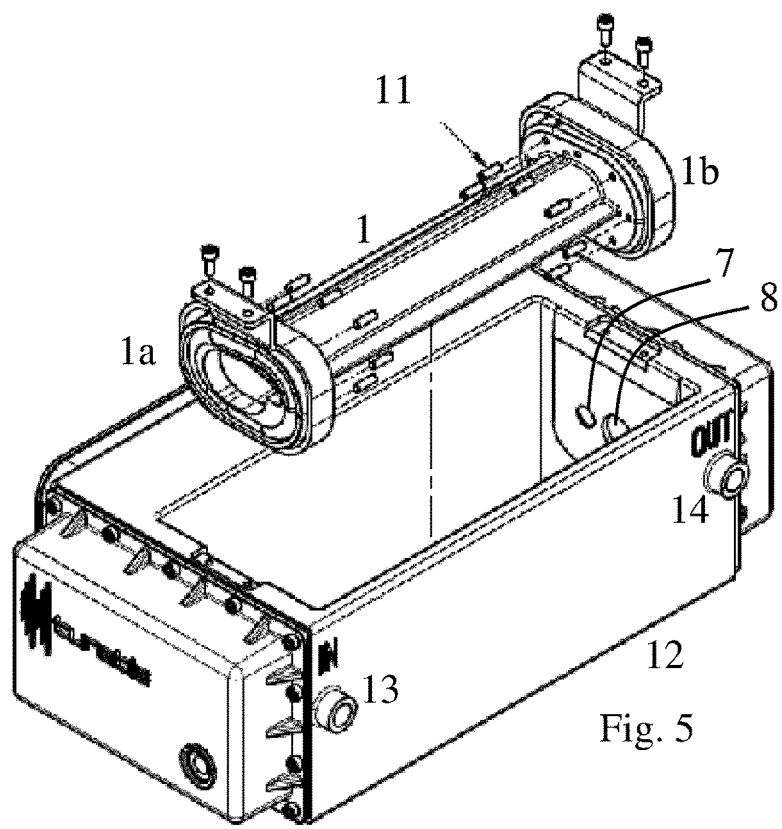

FIG. 5 illustrates the assembly including the measuring instrument and gas cell according to the preferred embodiment of the invention.

Figure 6:
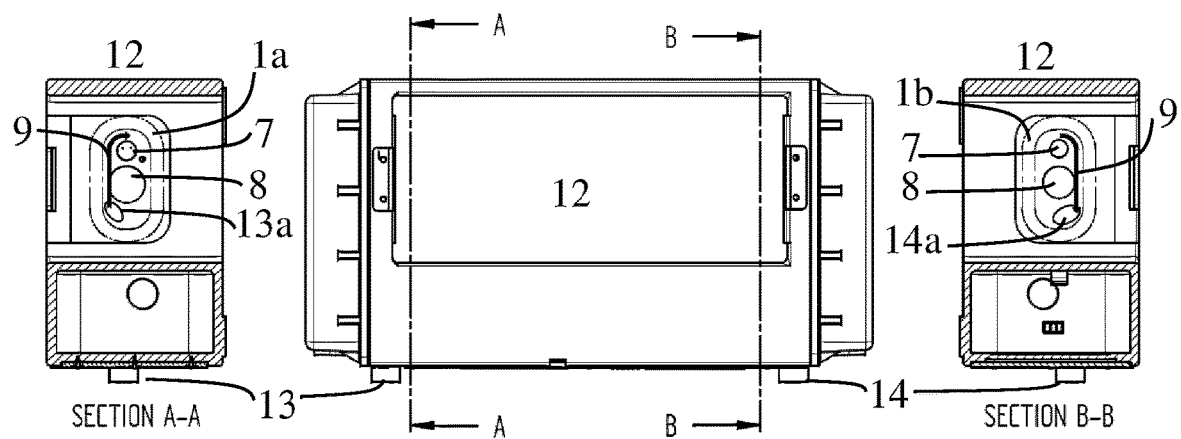

FIG. 6 illustrates the assembly shown in FIG. 5 from above as well as sections showing the connection between the cell and the measuring instrument.

Figure 7:
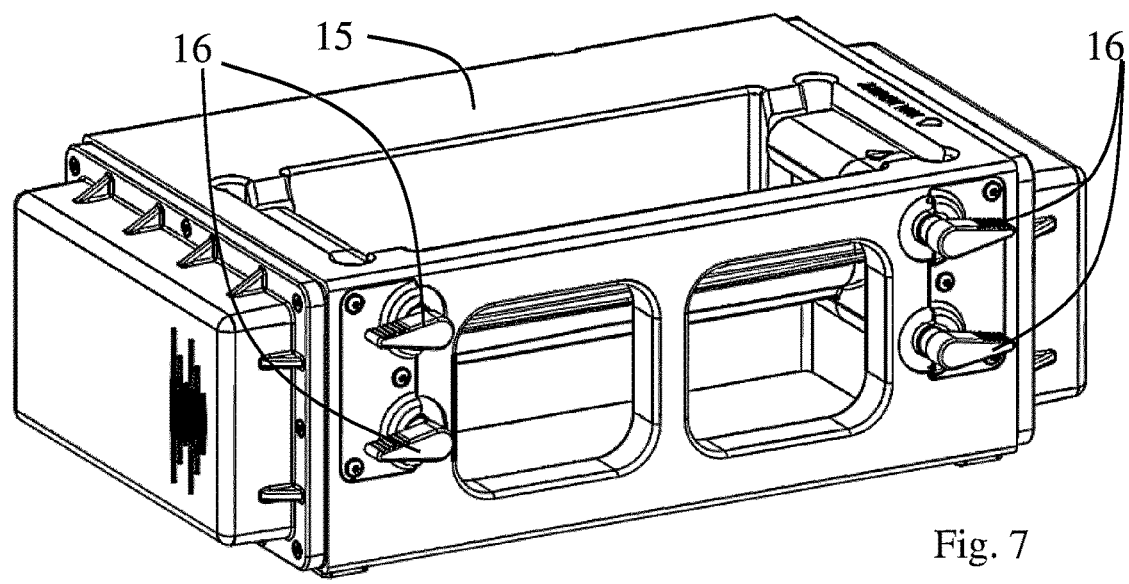

FIG. 7 Illustrates an alternative measuring instrument suitable for receiving the gas cell according to the invention.

Figure 8:
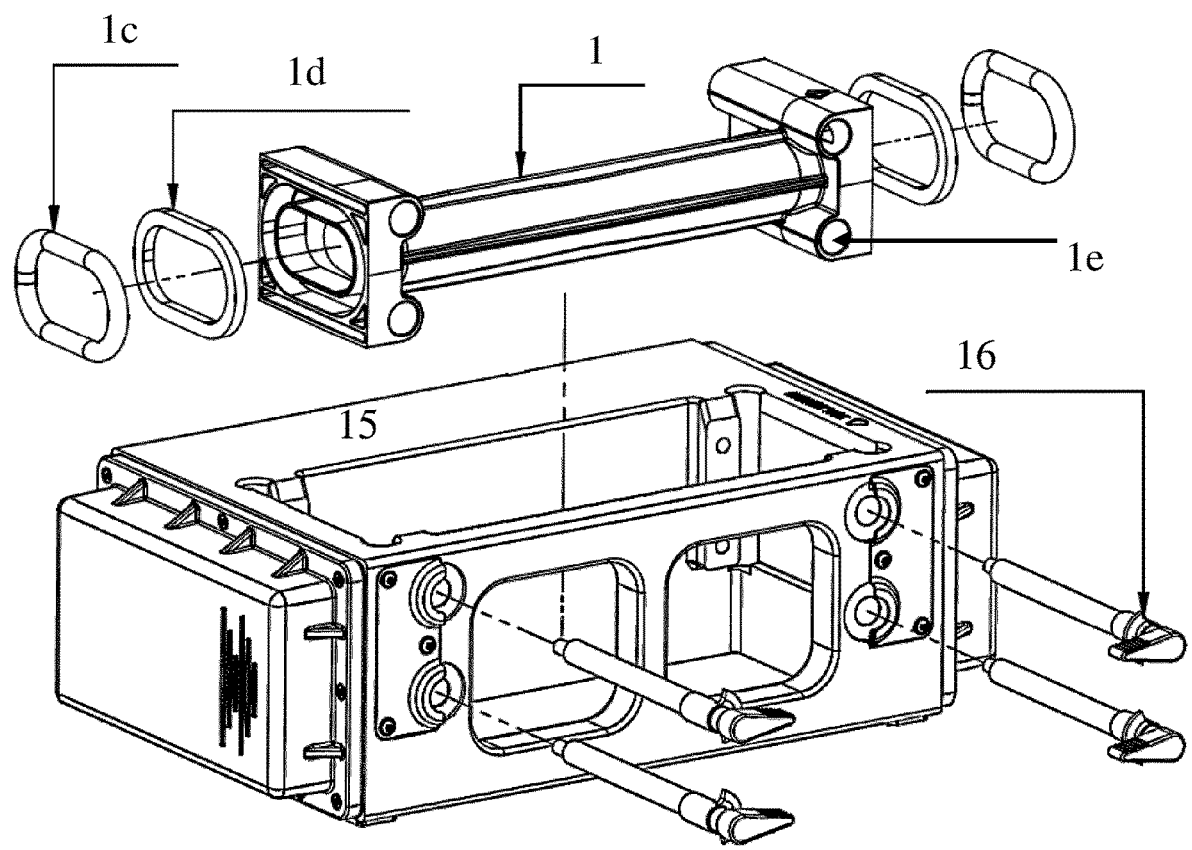

FIG. 8 illustrates the alternative instrument in FIG. 7 including the gas cell.

Figure 1:
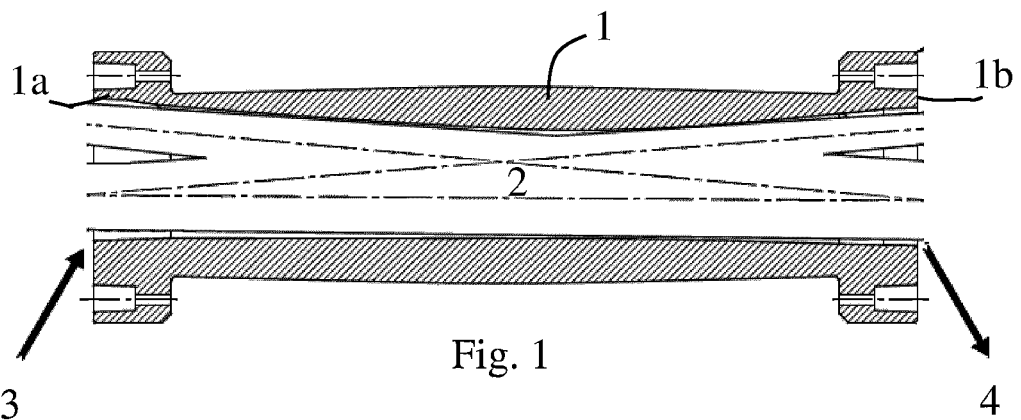
FIG. 1 illustrates the cross section of the gas cell according to the preferred embodiment of the invention.

FIG. 1 illustrates the gas cell according to the preferred embodiment of the invention constituted by a pipe 1 with a cell 2 through which the measured gas is to flow. The pipe has a gas inlet 3 and a gas outlet 4 and is also provided with a mounting section 1a,1b in each end e.g. including screws and seals 1c (FIG. 8) to mount the cell in a measuring instrument 12 (FIG. 5) including the optical components.

As discussed above and shown in FIG. 2 the volume of the cell is reduced to a minimum by calculating the shape of the trajectory of the optical beam 2a used to measure the gas. In the preferred embodiment shown in FIG. 2 the optical system 5a included in the measuring system includes a light source 6 emitting in a wavelength ranges chosen depending on the characteristics of the gas to be measured, as will be well known to a person skilled in the art. The source 6 may include a lens to shape or collimate the beam propagating from the first part 5a toward the second part 5b in the other end 1b of the pipe 1. At the second end 1b of the pipe the corresponding part 5b of the measuring instrument includes a mirror 8b reflecting the beam back though the cell toward a mirror 8a in the first end part 5a of the optical system. The mirror 8a in the first end part 5a reflects again through the cell toward a receiver 7 at the second part 5b of the optical system, where the receiver 7 and transmitter 6 are connected to a per se known measuring system analyzing the absorption specter of the gas. The envelope including the propagating and crossing optical beams 2a is calculated and the shape of the cell 2 is determined according to this shape 2a.

Figure 2:
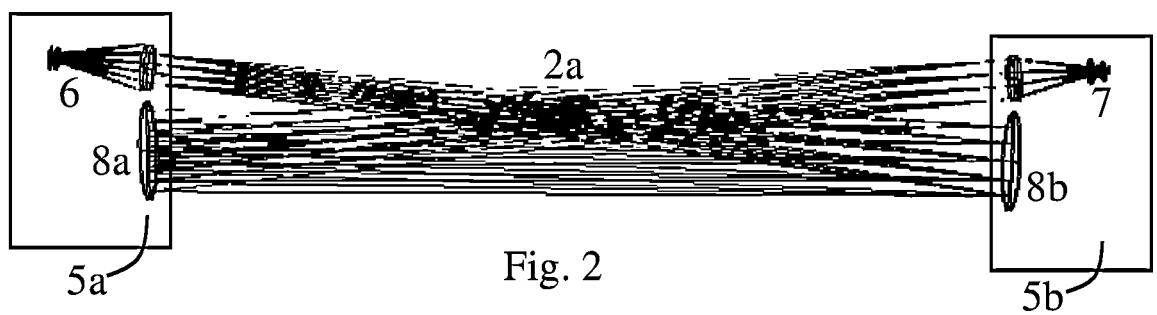
FIG. 2 illustrates the beam path of the optical measuring beam.

This way the optical beam in the preferred embodiment propagates through the gas three times, thus having the same effect as a measuring cell being three times as long, and as illustrated in FIG. 2 the optical beam may be configures to cross the same volume at least twice increasing the sensitivity of the system.

Other configurations may also be contemplated, such as adding one extra mirror on each end 5a, 5b on the opposite sides of the transmitter and receiver making the optical signal pass five times though the cell. Also, the beam may be shaped choosing different mirror shapes and lenses. It is, however, important that the cell 2 shape, or the inner shape of the pipe volume, corresponds to the beam shape in order to reduce the volume of the cell, as discussed above.

Figure 3:
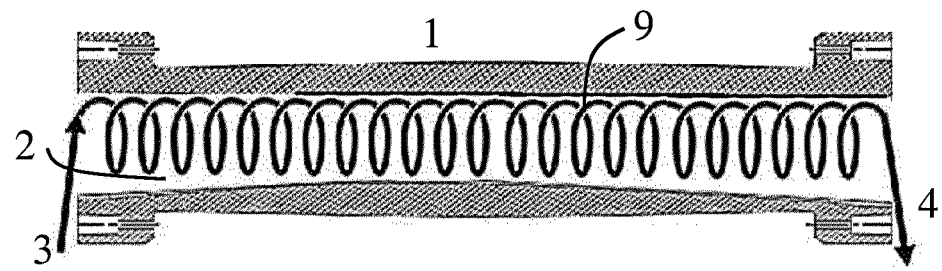
FIG. 3 illustrates the flow movement of the gas in the cell according to the preferred embodiment of the invention.

FIG. 3 illustrates how the gas flow 9 propagates along the cell 2 defined by the pipe 1. Providing a spiraling flow it is ensured that even if the composition of the gas is unevenly distributed the spiraling gas flow will pass the beams several time providing a realistic measure of the gas content, and at the same time force the old gas out of the cell without leaving any pockets of all gas behind.

The means for achieving the mixing is illustrated in FIG. 4a showing the input end of the measuring cell. In the drawing the gas enters the cell at the side of the optical components at an asymmetric feature 10a leading the gas toward one side of the cell, in the illustrated example this will lead the introduced gas into the upper wall of the cell and thus the pressure will force the gas around the shape of the cell as well as into the gas conductor achieving the vortex flow.

Figure 4B:
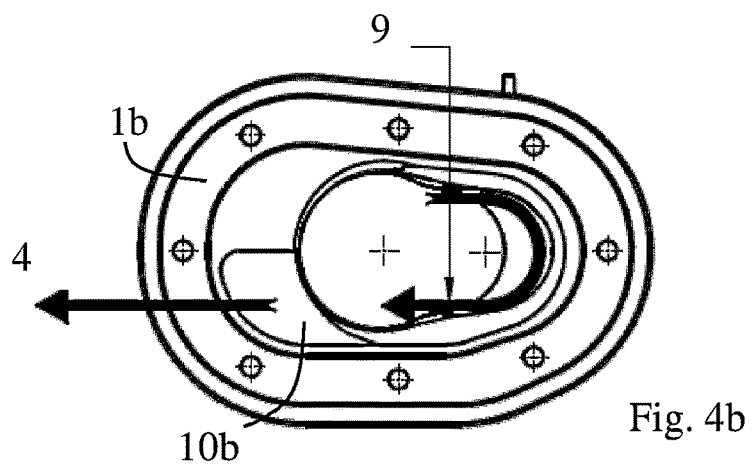

FIG. 4b illustrates a similar feature 10b on the output end of the gas conductor or cell making sure the vortex flow remains until it leaves the cell. Minor features along the cell pipe maintaining the vortex may also be contemplated as long as they do not interfere with the optical path or the gas movement through the cell.

Other solutions for mixing the gas may be contemplated but requires that the light beams are not obscured by any feature in the pipe. The illustrated example relates to a preferred embodiment including an asymmetric feature, but other features may also be used, such inserts or similar, e.g. positioned before the gas enters the light beam path.

FIG. 5 illustrates the assembly according to the preferred embodiment of the invention where the exchangeable measuring cell is mounted inside a measuring unit 12. As discussed above the measuring unit comprises the optical components 7,8 transmitting, reflecting and receiving the measuring light beam passing thought the cell. When the cell is removed the optical components are easily available for cleaning and the cell itself may be exchanged in a simple manner.

The measuring instrument 12 also includes inlet 13 and outlet 14 for the gas, As mentioned above this are leads to inputs close to the optical components so that the flow preferably enter the same opening in the measuring cell as the measuring light beam. This way the measurement is obtained along or against the gas flow vortex.

The cell is fastened and sealed to the measuring instrument with suitable means 11 available to a person skilled in the art.

FIG. 6 illustrates the measuring instrument 12 as seen from above, with sections A-A and B-B showing the connection area for the cell ends 1a, 1b. As can be seen the cell end covers and area enclosing the optical components 7,8 as well as the gas input 13a or output 14a connected to their respective inlet 13 and outlet 14. As is illustrated the shape of the cell at the input side 1a leads the gas into a swirling flow path 9 at the input and output ends.

This way the present invention provides a measuring cell of the multiple reflection type in which incident light is reflected a plurality of times. For analyzing a sample in the sample cell, comprising:

An external frame 12 where all optical parts like light source 6, detector 7, mirrors 8, as well as any windows or lenses are mounted and aligned and fixtured in correct positions in the measuring instrument, in such a way that the instrument is fully functional.

A gas guiding device 1 that can easily be included or exchanged, the gas guiding device functions as the walls in a gas cell as well as a fluid conductor from the input to the output side, and reduces the gas volume needed for the analysis.

The present invention is primarily aimed at gas measurements such as exhaust gases, as is reflected by the drawings but may be modified to provide measurements of liquids as well within the scope of the invention.

The gas guiding volume preferably occupies a space immediately beyond the envelope region within which the incident light passes in the sample cell and has means to generate a forced turbulence or mixing as discussed above, that leaves no pockets of old gas left when new gas is entering the cell under continuous flow. Preferably this flow pattern forms a spiral through the gas cell. In order to provide an efficient exchange of the gas, the length of the cell is at least 4 times longer than diameter of the device. This to avoid that pockets of old gas is left behind, and that the old and new gas are mixed.

FIGS. 7 and 8 illustrates an alternative instrument 15 housing where excentre bolts 16 are used to fasten the cell inside the instrument. As will be well known to a person skilled in the art, by entering the bolts into suitable openings 1e in the instrument and cell, and turning the bolts, in the illustrated example 180 degrees, the cell is locked in place.

As can be seen in FIG. 8 the preferred embodiment of the cell is shown with sealing means at both ends, in this case represented by a sealing ring 1c and a pressure plate 1d. Thus, when mounted in the instrument cavity the cell is sealed against the cavity ends, making sure the gas in the system does not escape.

The fluid measuring cell will preferably be made from a stiff material, and the device has means at each ends, enabling the user to force a gasket to seal the fluid between the fluid guiding device and the frame, making it tight for the present fluid. The cell material will preferably be a polymer such as POM (Polyoxymethylene), Teflon, PE (polyethylene) or PP (polypropylene).

To summarize the present invention relates to a retrievable measuring cell for optical measurements in gas. The cell being defined by a gas conducting pipe having an input end adapted to be connected to a gas flow input intruding gas into the cell and an output end adapted to be connected to a gas flow output.

The pipe ends of the gas cell are also being adapted to be coupled to optical components including an optical transmitter transmitting light into said cell and an optical receiver adapted to receive light having passed through said cell. The optical components included a light source, at least two mirrors and a light receiver being mounted in known positions on an external frame covered by the pipe ends, and thus defines a known beam shape.

The first of said pipe ends is adapted to be connected to a transmitter and at least one mirror and the second of said pipe ends is adapted to be connected to a receiver and the same number of mirrors as the first end. The light beam will then travel at least 3 times through said cell, depending on the number of mirrors, and wherein the cell has an elongated shape corresponding to the optical beam shape. The beam shape may be defined using beam shaping mirrors, lenses etc.

Preferably the cell at the pipe input end has an asymmetric shape being adapted to force a rotating gas flow or turbulence through said pipe, making sure the gas passing though the cell is mixed. Features in the flow path may also be used as long as it does not interfere with the gas throughput.

The pipe may include sealing means for connecting to a measuring instrument connected to the optical components comprising said flow input and output as well as said optical transmitter, receiver and mirrors.

The invention also relates to a measuring instrument for receiving the retrievable measuring cell in a defined space. The instrument comprises a flow input section adapted to provide a sealed connection to the flow input pipe end in a frame at a first end of said space and a flow output adapted to provide a sealed flow output connection to the output end of said pipe at the flow output, the measuring instrument also comprises said optical components at said sealed connections transmitting and receiving the light in said cell.

All optical components are mounted in known positions covered by the pipe ends and aligned and fixtured on an external frame constituted by the measuring instrument and in predetermined positions, in such a way that the optics are fully functional with or without the cell.

The invention claimed is:

1. A retrievable measuring cell for optical measurements in gas, the retrievable measuring cell comprising:
   a gas conducting pipe having an input end adapted to be connected to a gas flow input introducing gas into the cell and an output end adapted to be connected to a gas flow output;
   the gas input and output ends also being adapted to be coupled to optical components comprising an optical transmitter transmitting light into the cell and an optical receiver adapted to receive light having passed through the cell, an optical beam in the cell has a predetermined shape, the optical components comprising a light source, at least two mirrors and the optical receiver being mounted in different, known positions on an external frame and covered by the pipe ends;
   wherein a first of the input and output ends is adapted to be connected to the optical transmitter and at least one separate mirror and a second of the input and output ends is adapted to be connected to the optical receiver and the same number of mirrors as the first end, the light beam thus travelling at least 3 times though the cell;
   wherein the cell has an elongated shape corresponding to the optical beam shape; and
   wherein the cell at the pipe input end is adapted to force a rotating gas flow or a turbulence in the gas flow through the pipe.

2. The retrievable measuring cell according to claim 1, wherein the cell at the pipe input end has an asymmetric shape providing the rotating gas flow through the pipe.

3. The retrievable measuring cell according to claim 1, wherein the pipe comprises sealing means for connecting to a measuring instrument comprising the flow input and output as well as the optical transmitter, receiver and mirrors.

4. A measuring instrument comprising a space for receiving the retrievable measuring cell according to claim 1, the retrievable measuring cell comprising:
   a connection area for first and second cell ends on opposing sides of the space;
   wherein the connection area for the first cell end providing a sealed connection for the first cell end, the connection area comprising a gas input and optical components;
   the connection area for the second cell end providing a sealed connection for the second cell end, the connection area comprising a gas output and optical components; and
   wherein the optical components include a transmitter and at least one mirror in known, different positions within the connection area at the first side of the space and include a receiver and the same number of mirrors as the first end in known, different positions within the connection area at the second side of the space, the light beam thus travelling at least 3 times though the space, the beam path thus defining a beam envelope corresponding to the inner shape of the retrievable measuring cell.

5. The measuring instrument according to claim 4, wherein all optical components being mounted in known positions covered by the pipe ends are aligned and fixtured on an external frame constituted by the measuring instrument and in predetermined positions, in such a way that the optics are fully functional with or without the cell.

* * * * *